United States Patent
Rotbert et al.

(10) Patent No.: US 12,506,340 B2
(45) Date of Patent: Dec. 23, 2025

(54) SYSTEM AND METHOD FOR CONTROLLING A POWER GENERATING FACILITY

(71) Applicants: General Electric Renovables Espana, S.L., Barcelona (ES); James Gregory Rotbert, North Potomac, MD (US)

(72) Inventors: James Gregory Rotbert, North Potomac, MD (US); Alina Fatima Moosvi, Ballston Spa, NY (US); Patrick Hammel Hart, Ballston Lake, NY (US); Charles Joseph Kosuth, Albany, NY (US); Bacil Shaqqo, Roanoke, VA (US); Enno Ubben, Steinfurt (DE); Alev Akbulut, Rheine (DE)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 561 days.

(21) Appl. No.: 17/908,734

(22) PCT Filed: Mar. 3, 2020

(86) PCT No.: PCT/US2020/020797
§ 371 (c)(1),
(2) Date: Sep. 1, 2022

(87) PCT Pub. No.: WO2021/177947
PCT Pub. Date: Sep. 10, 2021

(65) Prior Publication Data
US 2023/0141934 A1 May 11, 2023

(51) Int. Cl.
*H02J 3/18* (2006.01)
*H02J 3/16* (2006.01)
*H02J 3/38* (2006.01)

(52) U.S. Cl.
CPC .............. *H02J 3/1885* (2013.01); *H02J 3/16* (2013.01); *H02J 3/381* (2013.01); *H02J 2300/28* (2020.01)

(58) Field of Classification Search
None
See application file for complete search history.

(56) References Cited

U.S. PATENT DOCUMENTS 10,027,118 B2   7/2018   Ubben et al.
11,067,060 B2 * 7/2021   Hart .......................... H02J 3/38
(Continued)

OTHER PUBLICATIONS

PCT International Search Report Corresponding to PCT/US2020/020797 Sep. 18, 2020.

*Primary Examiner* — Howard Cortes
(74) *Attorney, Agent, or Firm* — Dority & Manning, P.A.

(57) ABSTRACT

A system and method are provided for controlling a power generating facility. Accordingly, the facility-level controller determines a reactive-power-delivery coefficient for each power generating asset of the power generating facility. The reactive-power-delivery coefficient includes at least one of a reactive-power-generation coefficient and a reactive-power-transmission coefficient. The reactive-power-delivery coefficient is indicative of an impact on the active power production capability of each of the power generating assets due to a change in an amount of reactive power delivered to a point of interconnect. Based at least in part on the reactive-power-delivery coefficient, the facility-level controller determines a portion of a demand signal to be satisfied by each of the power generating assets.

18 Claims, 8 Drawing Sheets

(56) References Cited

U.S. PATENT DOCUMENTS

| | | | |
|---|---|---|---|
| 2008/0143304 A1* | 6/2008 | Bose | H02J 3/06 323/205 |
| 2010/0140937 A1* | 6/2010 | Kirchner | F03D 7/048 290/44 |
| 2013/0250635 A1* | 9/2013 | Sivakumar | H02M 7/44 363/71 |
| 2015/0027586 A1 | 1/2015 | Trost et al. | |
| 2015/0142191 A1* | 5/2015 | Bengtson | F03D 7/042 700/287 |
| 2015/0275862 A1* | 10/2015 | Babazadeh | H02J 3/50 290/44 |
| 2017/0328348 A1* | 11/2017 | Wilson | F03D 7/048 |
| 2019/0226454 A1* | 7/2019 | Bjørn | F03D 7/028 |
| 2020/0076193 A1* | 3/2020 | Biris | H02J 3/50 |
| 2021/0143642 A1* | 5/2021 | Gupta | H02J 3/001 |
| 2021/0164443 A1* | 6/2021 | Brombach | F03D 7/048 |

\* cited by examiner

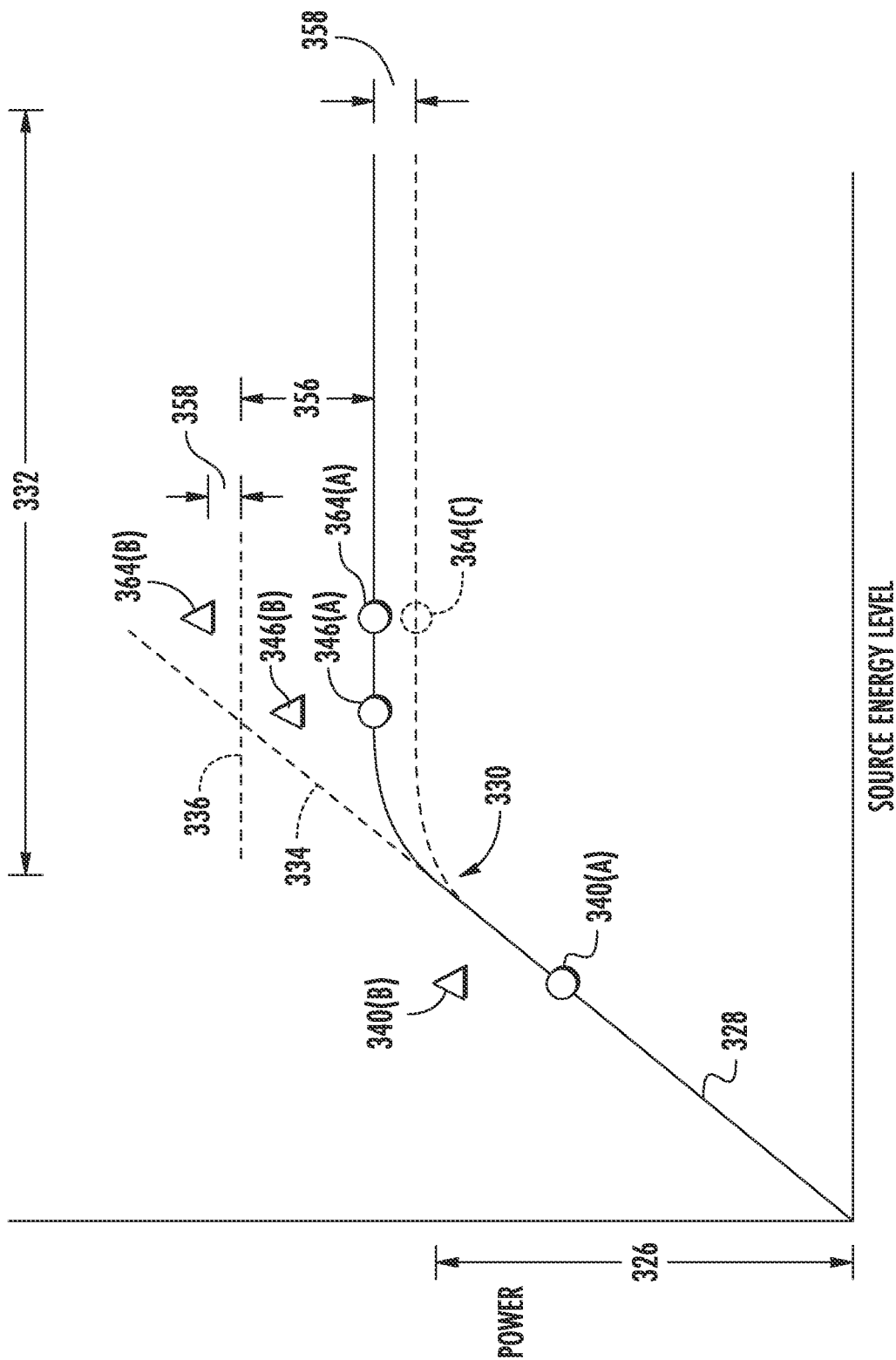

SYSTEM AND METHOD FOR CONTROLLING A POWER GENERATING FACILITY

RELATED APPLICATIONS

The present application claims priority to PCT Application Serial Number PCT/US2020/020797, filed on Mar. 3, 2020, which is incorporated by reference herein.

FIELD

The present disclosure relates in general to power generating facilities, and more particularly to systems and methods for controlling power generating facilities having a plurality of power generating assets.

BACKGROUND

Renewable power is considered one of the cleanest, most environmentally friendly energy sources presently available, and power generating facilities which include renewable power assets have gained increased attention in this regard. One example of such a renewable power asset is a wind turbine. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

Modern electrical grid regulations often require the power generating facility (e.g. a wind farm) to produce an amount of reactive power when demanded by the electrical grid. Depending on the operating state of each of the power generating assets (e.g. wind turbines), an increase in one unit of reactive power may result in a reduction in the active power production of the power generating asset. Since the active power is the power component typically sold by the power generating facility to the electrical grid, it is often desirable to limit reductions in the active power production.

Additionally, a modern renewable-power generating facility may contain over one hundred power generating assets regulated at a single point of interconnect (POI) with the electrical grid. To maximize power generation, the power generating assets are typically spread across large areas of land. However, one drawback of such an arrangement is that a significant portion of the power produced by the power generating assets may be lost in transmission as the current travels the distances from the power generating asset to the POI. These losses may result in a substantial difference between the amount of power produced by the power generating assets and the amount of power delivered to the electrical grid. As such, it is typically desirable to limit power losses due to the distances the generated power must travel to reach the POI.

The power generating assets of the modern renewable-power generating facility are also typically arranged along feeder lines. This arrangement often results in the power generating assets at the end of feeder lines suffering from a voltage staircase effect. This voltage staircase occurs when power generating assets along the same feeder line recursively increase or decrease a neighboring power generating asset's voltages due to the asset's injection or absorption of reactive power, respectively. This voltage increase/decrease causes power generating assets at the end of feeder lines to spend a significant portion of their life operating at higher or lower voltages when injecting or absorbing reactive power. In other words, the voltage staircase may force power generating assets that are further from the POI to run consistently at non-nominal voltages, which can decrease the useful life of the power generating asset. It is often desirable to limit or reduce the impact of voltage staircase effect on those power generating assets located the greatest distance from the POI.

Thus, the art is continuously seeking new and improved systems to control power generating facilities and tailor the reactive power production demands so as to minimize the impact on active power production capabilities. Accordingly, the present disclosure is directed to systems and methods for controlling a power generating facility so as to establish reactive power setpoint commands for the individual power generating assets based on the reactive-power delivery coefficient for each of the power generating assets.

BRIEF DESCRIPTION

Aspects and advantages of the invention will be set forth in part in the following description, or may be obvious from the description, or may be learned through practice of the invention.

In one aspect, the present disclosure is directed to a method for controlling a power generating facility connected to an electrical grid. The power generating facility may have a plurality of power generating assets. The method may include receiving, with a facility-level controller of the power generating facility, a demand signal from the electrical grid. The method may also include determining, with the facility-level controller, a reactive-power-delivery coefficient for each of the power generating assets. The reactive-power-delivery coefficient may include at least one of a reactive-power-generation coefficient and a reactive-power-transmission coefficient. The reactive-power-delivery coefficient may be indicative of an impact on an active power production capability of each of the power generating assets due to a change in an amount of reactive power delivered to a point of interconnect (POI) for the power generating facility. Additionally, the method may include determining, with the facility-level controller, a portion of the reactive power demand signal to be satisfied by each of the plurality of power generating assets based on the reactive-power-delivery coefficient of each of the power generating assets. The portion of the reactive power demand signal satisfied by at least one power generating asset may be greater than the portion satisfied by at least one additional power generating asset. The method may also include generating, with the facility-level controller, a setpoint command for each of the power generating assets. Further, the method may include transmitting the setpoint commands to each of the plurality of power generating assets so as to control a reactive power output of each of the plurality of power generating assets.

In an embodiment, determining which portion of the reactive power demand signal to be satisfied by each of the plurality of power generating assets may also include rank ordering, with the facility-level controller, the reactive-power-delivery coefficient for each of the power generating assets. A higher reactive-power-delivery coefficient may indicate a greater impact on the active power production capability of one of the plurality of power generating assets relative to a lower reactive-power-delivery coefficient of an additional power generating asset of the plurality of power generating assets. A distribution of the portions of the reactive power demand signal may be based on the rank ordering.

In an additional embodiment, determining the reactive-power-delivery coefficient may include determining, with the facility-level controller, the reactive-power-transmission coefficient for each of the power generating assets. The reactive-power-transmission coefficient may be indicative of the ability of each of the power generating assets to transmit reactive power to the POI. The reactive-power-transmission coefficient may be based at least partially on a distance between each of the power generating assets and the POI.

In a further embodiment, determining the reactive-power-transmission coefficient may include combining, with the facility-level controller, a POI impedance for the power generating facility with a dynamic-transmission efficiency for each of the power generating assets. The transmission efficiency may correspond to an ability of each of the power generating assets to transmit reactive power to the POI at a given power set point.

In yet a further embodiment, the plurality of power generating assets may be partitioned into a plurality of asset groups. Each of the asset groups may be coupled to a corresponding feeder line so as to be coupled in series to the POI. The method may also include receiving, with the facility-level controller, an indication of an operating state of each of the power generating assets. The operating state may include an active power production, a reactive power production, a voltage setpoint, and an operating temperature for each of the power generating assets. The method may also include determining, with the facility-level controller, the dynamic-transmission efficiency for each of the power generating assets based on the operating state and a position of each of the power generating assets within each asset group relative to the POI.

In an embodiment, determining the reactive-power-delivery coefficient may include determining, with a controller, an operating state of each of the power generating assets. The operating state may include an active power production, a reactive power production, a voltage setpoint, and an operating temperature for each of the power generating assets. The method may also include determining, with the controller, the reactive-power-generation coefficient for each of the power generating assets. The reactive-power-generation coefficient may be indicative of a reduction in kilowatts of the active power production capability per unit of increased reactive power production for each power generating asset at the determined operating state.

In an additional embodiment, determining the reactive-power-delivery coefficient may include determining, with the facility-level controller, the reactive-power-transmission coefficient for each of the power generating assets. The reactive-power-transmission coefficient may be indicative of the ability of each of the power generating assets to transmit reactive power to the POI. The reactive-power-transmission coefficient may be based at least partially on a distance between each of the power generating assets and the POI. The method may also include calculating the reactive-power-delivery coefficient by combining, with the facility-level controller, the reactive-power-generation coefficient and the reactive-power-transmission coefficient.

In a further embodiment, the operating state may be an operating state configured to maximize power production, and determining the reactive-power-generation coefficient may include modeling, with the controller, an incremental cost in kilowatts corresponding to a reduction in the active power production capability necessitated by an increase in an amount of generated reactive power at the operating state. The reactive-power-generation coefficient may equal an incremental cost in kilowatts for each additional unit of reactive power.

In yet a further embodiment, the operating state may be an operating state configured to limit power production, and determining the reactive-power-generation coefficient may include determining, with the controller, a source energy level sufficient to support an increased power production of at least one of the power generating assets. The increased power production may be below an asset threshold. The increased power production may include an increase in the reactive power production while the active power production remains constant. The active power production may yield a reactive-power-generation coefficient of zero.

In an additional embodiment, the operating state may be an operating state configured to limit power production, and determining the reactive-power-generation coefficient may include determining, with the controller, a source energy level sufficient to support an increased power production of at least one of the power generating assets. The method may also include determining, with the controller, a first portion of an increase in the reactive power production satisfied by the increased power production without crossing an asset threshold. The method may further include modeling, with the controller, an incremental cost in kilowatts corresponding to a reduction in the active power production capability necessitated by a second portion of the increase in the reactive power production. The reactive-power-generation coefficient may equal an incremental cost in kilowatts for each additional unit of reactive power not satisfied by the increased power production.

In an embodiment, the power generating facility may include a wind farm and the plurality of power generating assets may include a plurality of wind turbines.

In an additional embodiment, the plurality of power generating assets may include a plurality of substations of the power generating facility.

In another aspect, the present disclosure is directed to a system for controlling a power generating facility. The system may include a plurality of power generating assets coupled to an electrical grid. The system may also include a facility-level controller communicatively coupled to the plurality of power generating assets and to the electrical grid. The facility-level controller may include at least one processor configured to perform a plurality of operations. The plurality of operations may include receiving, a reactive power demand signal from the electrical grid. The operations may also include determining a reactive-power-delivery coefficient for each of the power generating assets including at least one of a reactive-power-generation coefficient and a reactive-power-transmission coefficient. The reactive-power-delivery coefficient may be indicative of an impact on an active power production capability of each of the power generating assets due to an increase in an amount of reactive power delivered to a POI for the power generating facility. Additionally, the operations may include determining a portion of the reactive power demand signal to be satisfied by each of the plurality of power generating assets based on the reactive-power-delivery coefficient for each of the power generating assets. The portion of the reactive power demand signal satisfied by at least one power generating asset is greater than the portion satisfied by at least one additional power generating asset. The operations may also include generating a reactive power setpoint command for each of the power generating assets. Further, the operations may include transmitting the reactive power setpoint commands to each of the plurality of power generating assets so as to control a reactive power output of each of the plurality of power generating assets. It should be understood that the system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 illustrates a power curve relative to a source energy level for a power generating asset according to the present disclosure.

Figure 1:
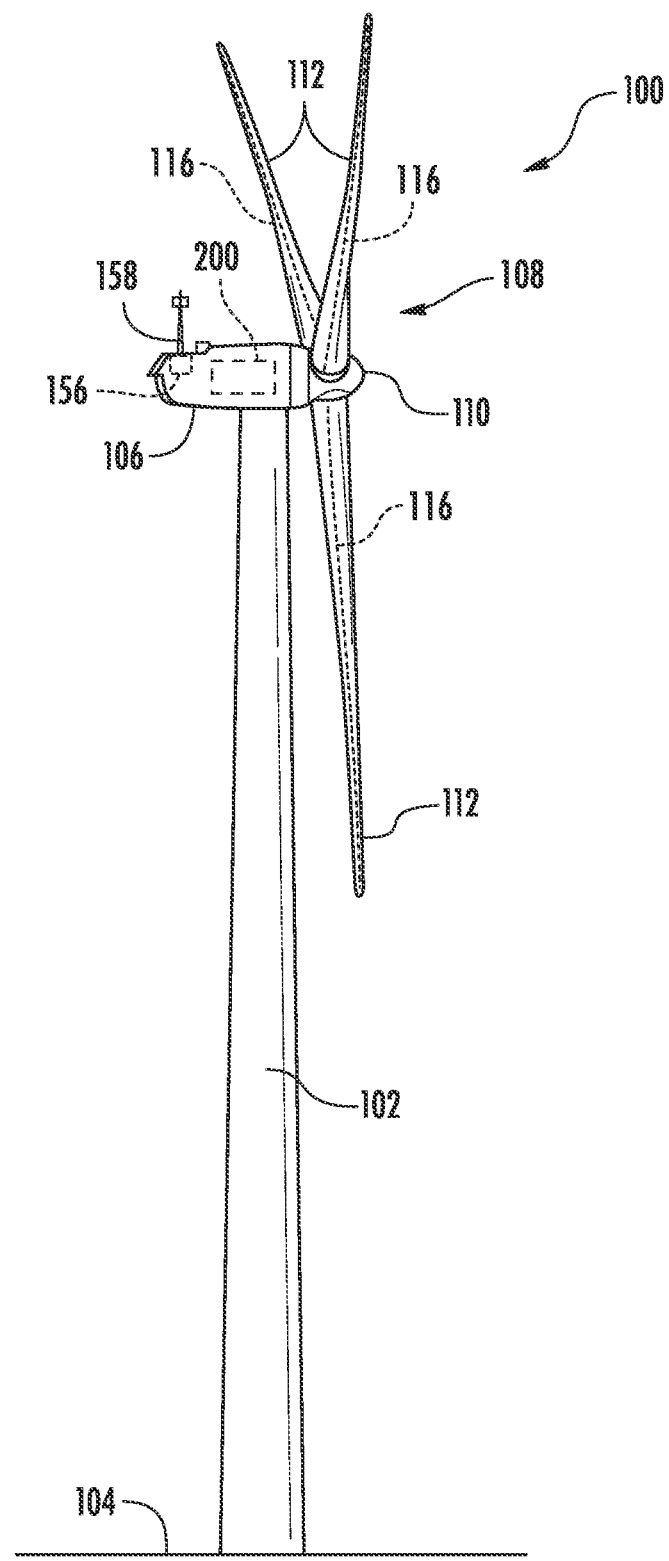
FIG. 1 illustrates a perspective view of one embodiment of a power generating asset according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a power generating facility (e.g. a wind farm) connected to an electrical grid. In particular, the present disclosure may include a system and method which may facilitate tailoring the power production of the various power generating assets of the power generating facility (e.g. wind turbines of the wind farm) in order to satisfy a demand signal from the electrical grid. Accordingly, the facility-level controller may determine a reactive-power-delivery coefficient for each of the power generating assets. The reactive-power-delivery coefficient may include a reactive-power-generation coefficient and/or a reactive-power-transmission coefficient.

The reactive-power-delivery coefficient may indicate an incremental cost for each power generating asset to send an additional unit of reactive power to a POI of the power generating facility. This incremental cost may be attributable to a static impedance due to the site layout and cable sizes, and to a dynamic-transmission efficiency related to the positioning of each power generating asset on a feeder line.

The reactive-power-generation coefficient may indicate an impact on the active power production capability of each of the power generating assets when additional reactive power generation is requested from each of the power generating assets. The reactive-power-generation coefficient may be based on an operating state of each of the power generating assets. The operating state may include an active power production level, a reactive power production level, a voltage setpoint, and an operating temperature for each of the power generating assets.

Based on the reactive-power-delivery coefficient, the controller of the power generating facility may rank order the various power generating assets and portion the demand signal based on the rank order. In other words, the controller may assign a greater portion of the demand signal to be met by those power generating assets that the reactive-power-delivery coefficient indicates are best suited to meeting the demand, while minimizing an impact on the active power production that is delivered to the POI and ultimately sold to the electrical grid.

Referring now to the drawings, FIG. 1 illustrates a perspective view of one embodiment of a power generating asset 100 according to the present disclosure. As depicted in FIG. 1, in an embodiment, the power generating asset 100 may be a wind turbine. However, in additional embodiments, the power generating asset 100 may be any other suitable power generating asset such as a hydro-electric turbine; a solar system, a fossil fuel generator, and/or a combination thereof. In a further embodiment, the power generating asset 100 may be a sub-station to a plurality of individual power generating assets 100.

As depicted in FIG. 1, when configured as a wind turbine, the power generating asset 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

The power generating asset 100 may also include a controller 200. When configured as a wind turbine, the controller 200 may be centralized within the nacelle 106. However, in other embodiments, the controller 200 may be located within any other component of the power generating asset 100 or at a location outside the power generating asset 100. Further, the controller 200 may be communicatively coupled to any number of the components of the power generating asset 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing power generating asset control signals.

Still referring to FIG. 1, one or more sensors 156, 158 may be provided on the power generating asset 100 to monitor the performance of the power generating asset 100 and/or environmental conditions affecting the power generating asset 100. It should also be appreciated that, as used herein, the term "monitor" and variations thereof indicates that the various sensors of the power generating asset 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine the condition of the power generating asset 100.

For example, as shown, each of the power generating assets 100 may include an environmental sensor 158 configured for gathering data indicative of at least one environmental condition. The environmental sensor 158 may be operably to the controller 200. Thus, in an embodiment, the environmental sensor(s) 158 may, for example, be a wind vane, an anemometer, a lidar sensor, thermometer, barometer, or other suitable sensor. The data gathered by the environmental sensor(s) 158 may include measures of wind speed, wind direction, wind shear, wind gust, wind veer, atmospheric pressure, and/or temperature. In at least one embodiment, the environmental sensor(s) 158 may be mounted to the nacelle 106 at a location downwind of the rotor 108. The environmental sensor(s) 158 may, in alternative embodiments, be coupled to, or integrated with, the rotor 108. It should be appreciated that the environmental sensor(s) 158 may include a network of sensors and may be positioned away from the power generating assets 100. It should be further appreciated that, in an embodiment, the environmental sensor(s) 158 may provide data indicative of the energy level of the energy source for the power generating assets 100.

In addition to the environmental sensor(s) 158, the power generating assets 100 may also include one or more asset condition sensors 156. The asset condition sensor(s) 156 may, for example, be configured to monitor electrical properties of the output of the generator of each of the power generating assets 100, such as current sensors, voltage sensors temperature sensors, or power sensors that monitor power output directly based on current and voltage measurements. In at least one embodiment, the asset condition sensor(s) 156 may include any other sensors that may be utilized to monitor the operating state of the power generating assets 100.

Figure 2:
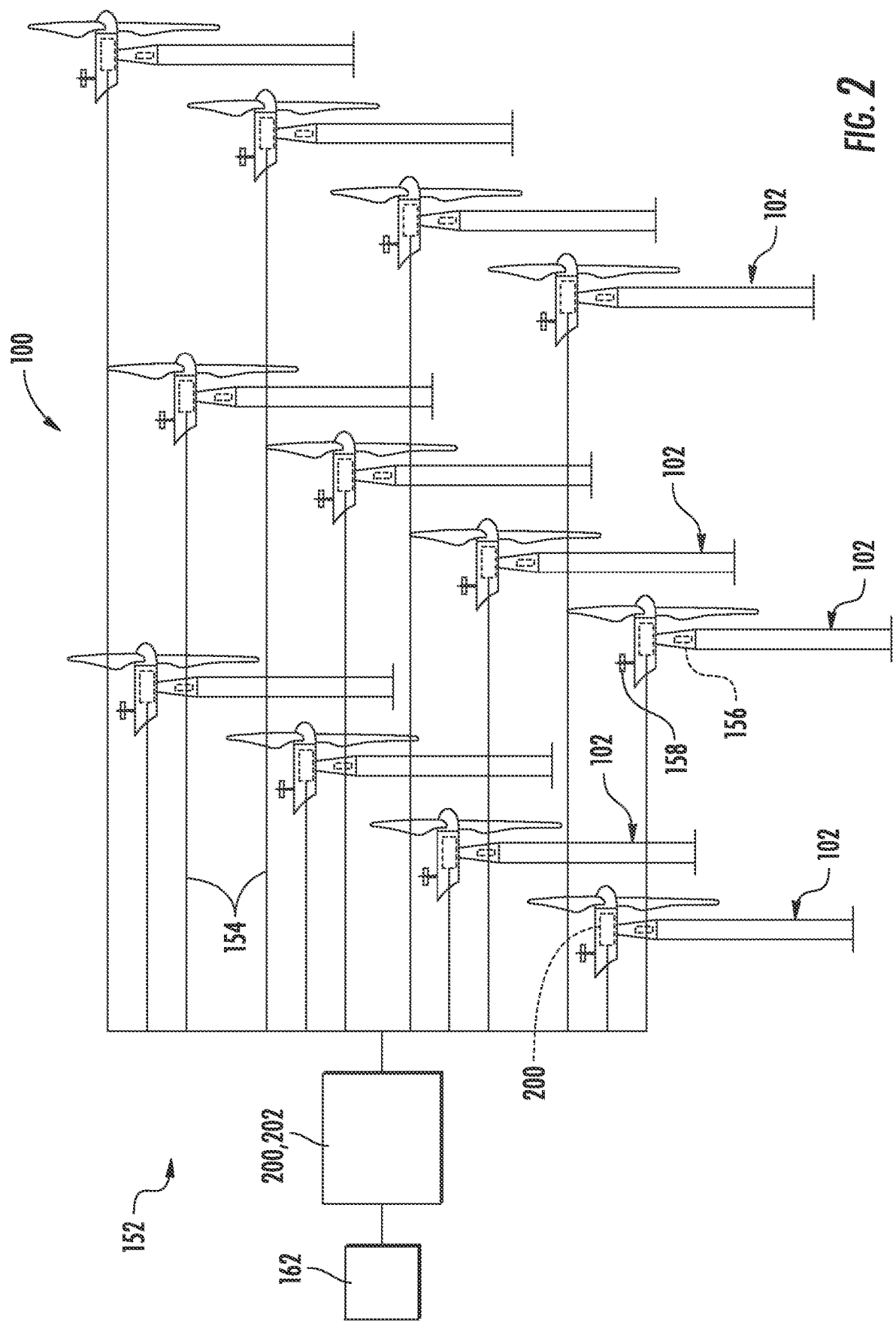
FIG. 2 illustrates a schematic diagram of one embodiment of a power generating facility configured as a wind farm having a plurality of wind turbines according to the present disclosure.
Figure 4:
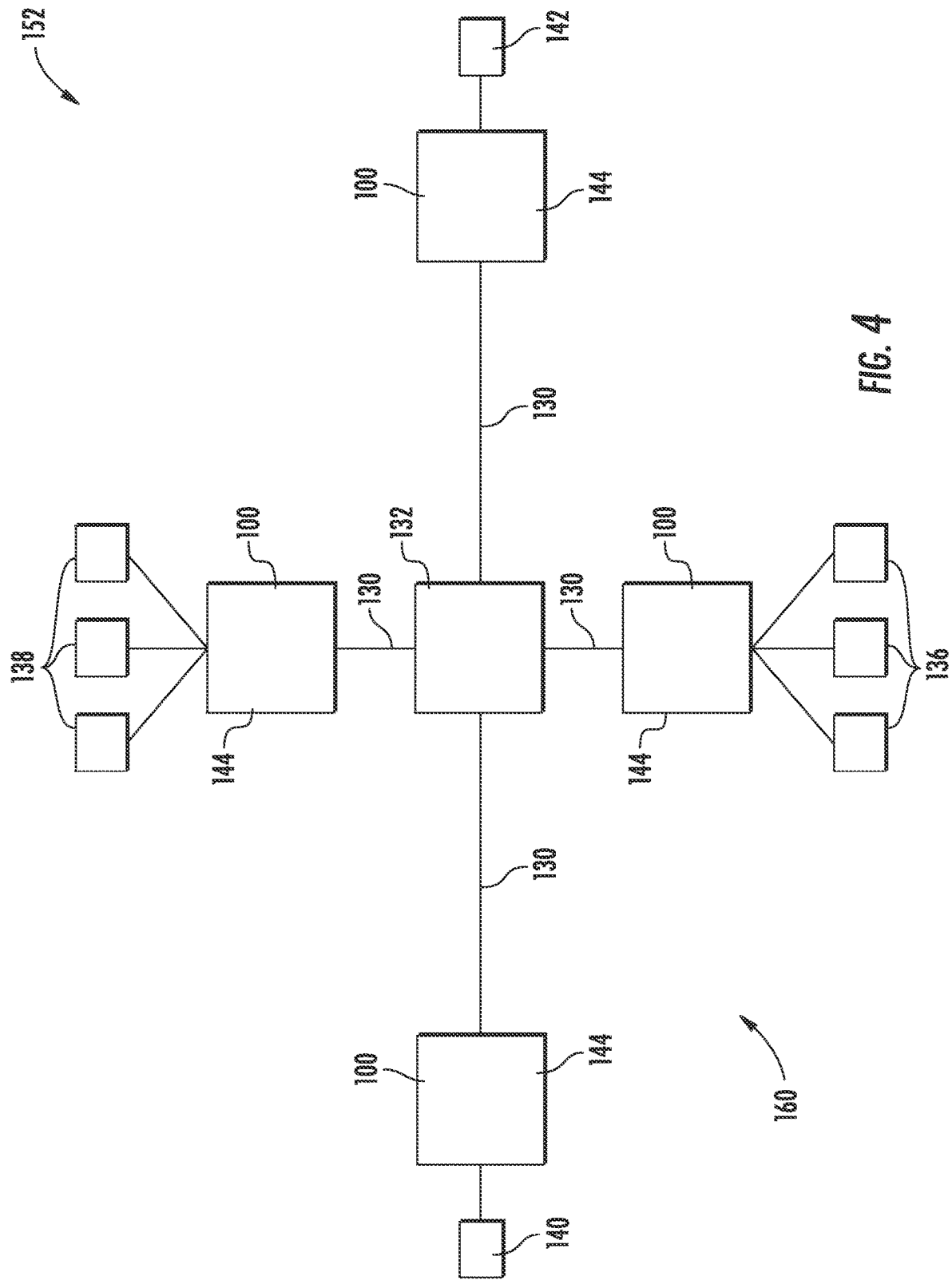
FIG. 4 illustrates a schematic diagram of an embodiment of the power generating facility of FIG. 2 configured as a hybrid power generating facility according to the present disclosure.

Referring now to FIG. 2, a schematic view of a power generating facility 152 controlled according to the system and method of the present disclosure is illustrated. In an embodiment, such as depicted in FIG. 2, the power generating facility 152 may be configured as a wind farm. However, in additional embodiments, the power generating facility 152 may be any other suitable power generating facility such as a hydro-electric facility; a solar farm, a fossil fuel generator site, and/or a combination thereof, such as a hybrid power generation facility 160 (FIG. 4). As shown, the power generating facility 152 may include a plurality of the power generating assets 100 described herein and a controller 200. The controller 200 may be configured as a facility-level controller 202. For example, as shown in the illustrated embodiment, the power generating facility 152 may include twelve power generating assets 100. However, in other embodiments, the power generating facility 152 may include any other number of power generating assets 100, such as less than twelve power generating assets 100 or greater than twelve power generating assets 100. In one embodiment, the controller(s) 200 of the power generating asset(s) 100 may be communicatively coupled to the facility-level controller 202 through a wired connection, such as by connecting the controller(s) 200 through suitable communicative links 154 (e.g., a suitable cable). Alternatively, the controller(s) 200 may be communicatively coupled to the facility-level controller 202 through a wireless connection, such as by using any suitable wireless communications protocol known in the art. In addition, the facility-level controller 202 may be generally configured similar to the controller 200 for each of the individual power generating assets 100 within the power generating facility 152.

Figure 6:
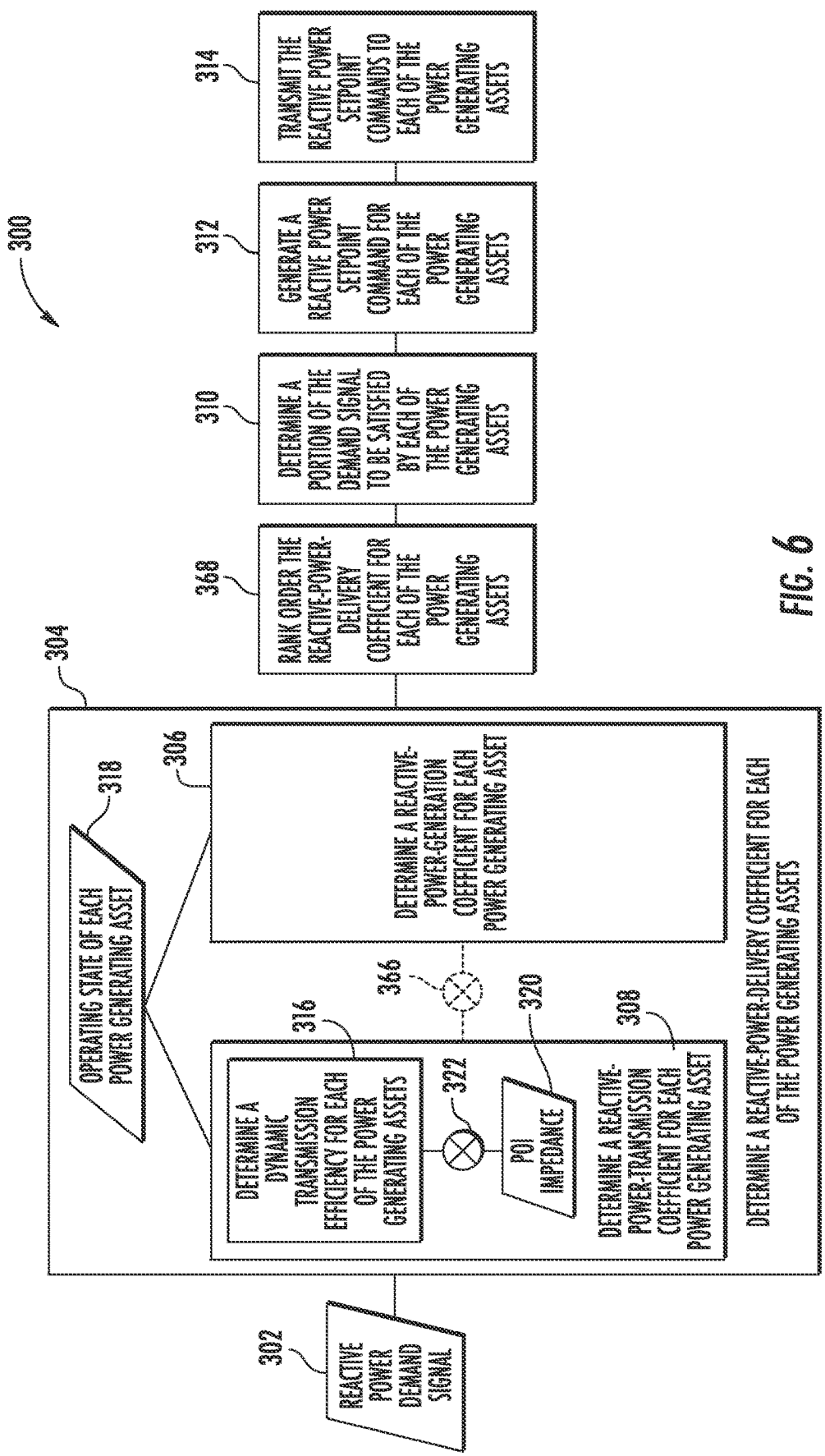
FIG. 6 illustrates a schematic diagram of one embodiment of a control logic of a system for operating a power generating facility according to the present disclosure.

In an embodiment, the facility-level controller 202 may also be operably coupled to at least one grid sensor 162. The grid sensor(s) 162 may be operably coupled to an electrical power grid. The grid sensor(s) 162 may be configured to detect a demand signal from the electrical grid. In at least one embodiment, the demand signal may be a reactive power demand signal 302 (FIG. 6). It should be appreciated that in additional embodiments, the demand signal may also be a voltage setpoint, a reactive power setpoint, or other power factor setpoint.

Figure 3:
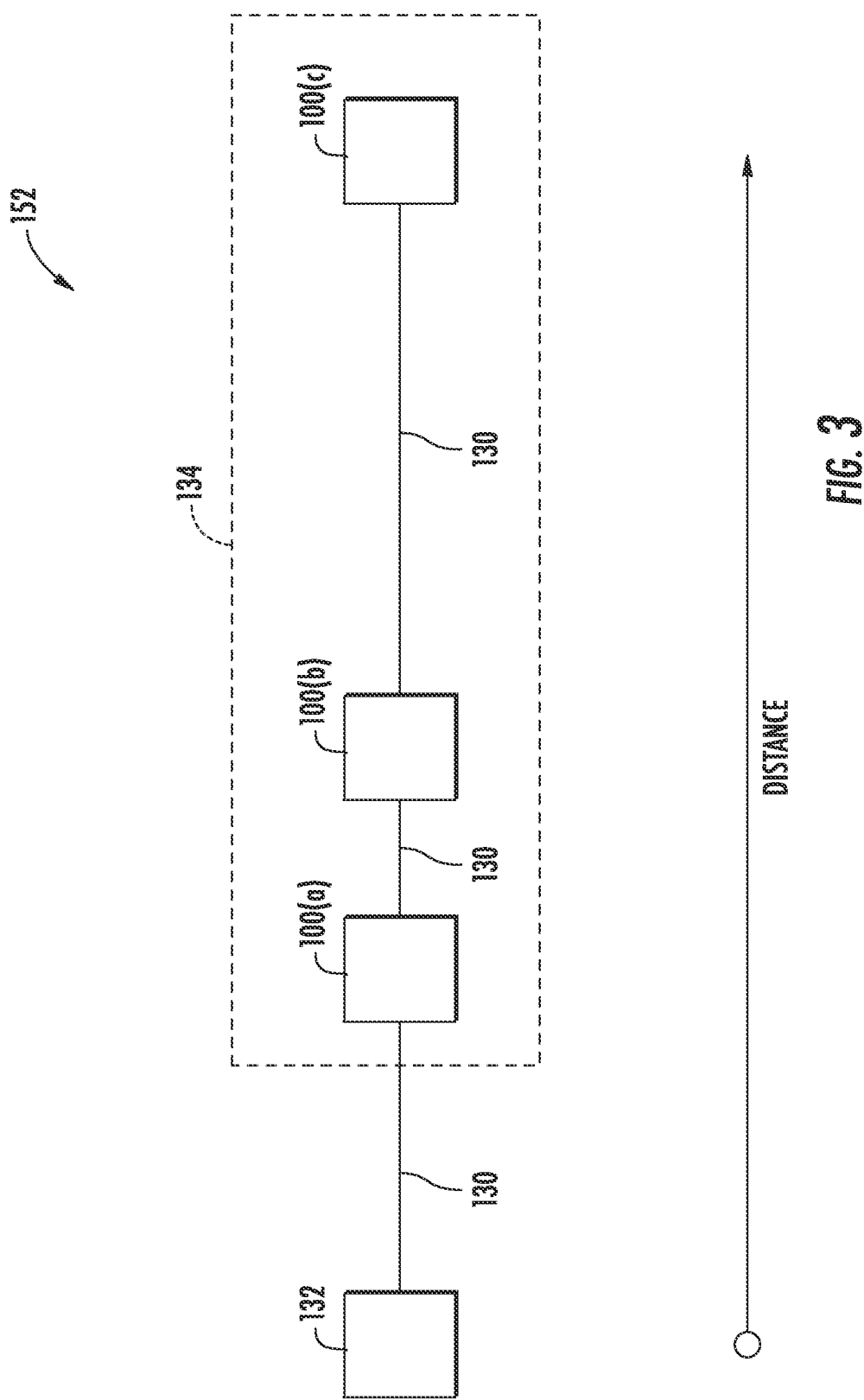
FIG. 3 illustrates a schematic diagram of a portion of the power generating facility FIG. 2 particularly illustrating an asset group coupled in series to a corresponding feeder line according to the present disclosure.

Referring now to FIG. 3, in several embodiments, the power generating facility 152 may include at least one feeder line 130. The feeder line(s) 130 may electrically couple the power generating assets 100 to a point of interconnect (POI) 132 for the power generating facility 152 and ultimately on to the electrical grid. In an embodiment, power may be transmitted along the feeder line(s) 130 between the power generating assets 100 and the POI 132. For example, in at least one embodiment, power generated by the power generating assets 100 may be transmitted along the feeder line(s) 130 to the POI 132 and ultimately to the electric grid. In an additional embodiment, active and/or reactive power may be delivered to the power generating assets 100 by the feeder line(s) 130.

In at least one embodiment a portion of the power generating assets 100 may be distributed in series along a single feeder line 130 as an asset group 134. In such an embodiment, a voltage staircase or voltage bowl may result among the portion of the power generating assets 100 distributed along the feeder line 130. The voltage staircase may occur when the power generating asset 100 positioned closest to the POI 132 generates some percentage of power greater than the required power production in order to drive the generated power to the POI 132. This may result in the line voltage at the subsequent power generating asset 100 in series being the required power production, plus the overage percentage generated by the preceding power generating asset 100. As a result, the subsequent power generating asset 100 may generate an additional percentage of power to overcome the increase in line voltage. For example, in an embodiment wherein three power generating assets 100 may be serially arranged, the first power generating asset 100(a) may generate 105% of the required voltage, the second power generating asset 100(b) may generate 107% of the required voltage, while the third power generating asset 100(c), located furthest from the POI 132, may be required to generate 112% of the required power production. As such, the third power generating asset 100 may be required to operate at a non-nominal voltage. It should be appreciated that the increasing power generation levels of subsequent power generating assets 100 may correlate to a reduction in the ability of the power generating assets to satisfy a reactive power production requirement.

As depicted in FIG. 4, the power generating facility 152 may, in an embodiment, be configured as a hybrid power generating facility 160. For example, the power generating facility 152 may include wind turbines 136, solar panels 138, hydroelectric facilities 140 and/or fossil fuel generators 142. In an embodiment, the wind turbines 136, solar panels 138, hydroelectric facilities 140 and/or fossil fuel generators 142 may be coupled to a plurality of substations 144 of the power generating facility 152. In at least one embodiment, the plurality of substations 144 may be considered to be the power generating assets 100.

Figure 5:
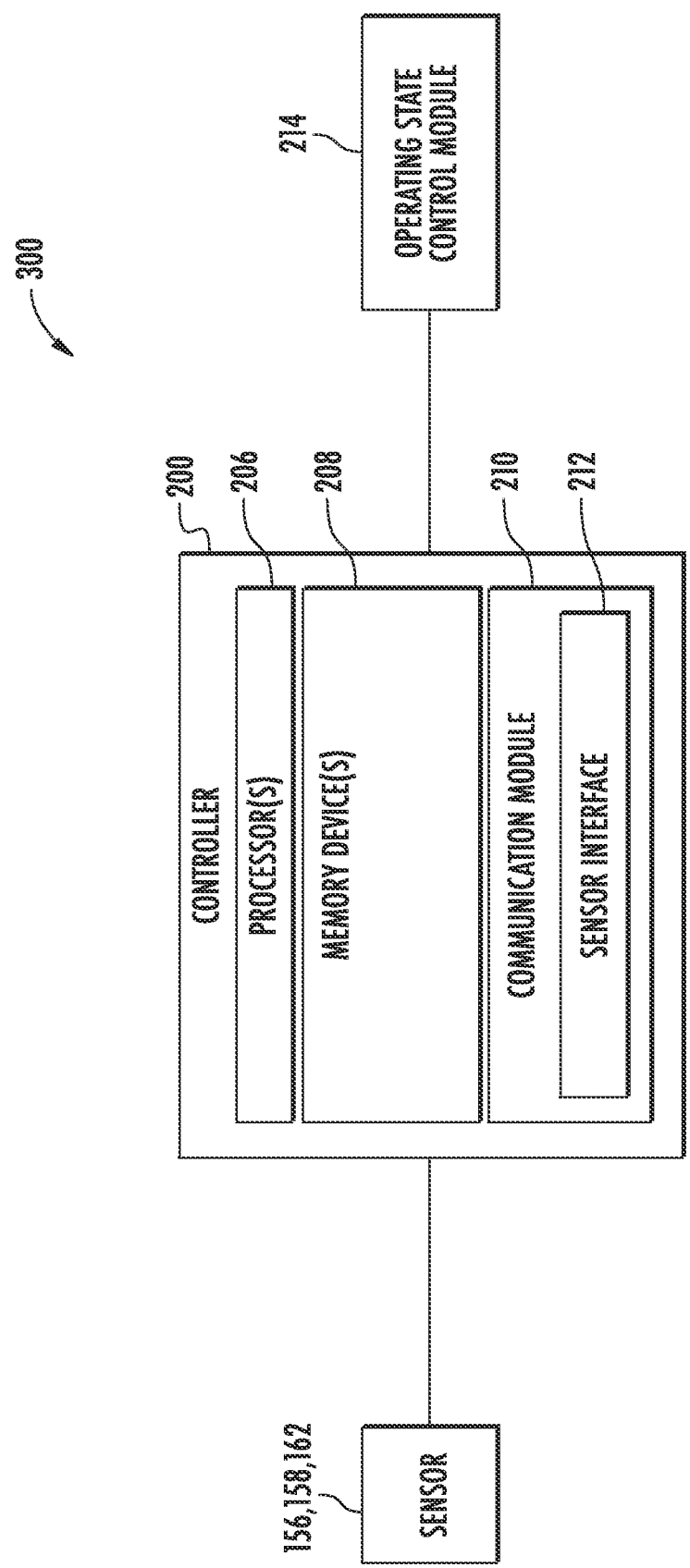
FIG. 5 illustrates a schematic diagram of one embodiment of a controller for use with the power generating facility as shown in FIG. 2 according to the present disclosure.
Figure 7:
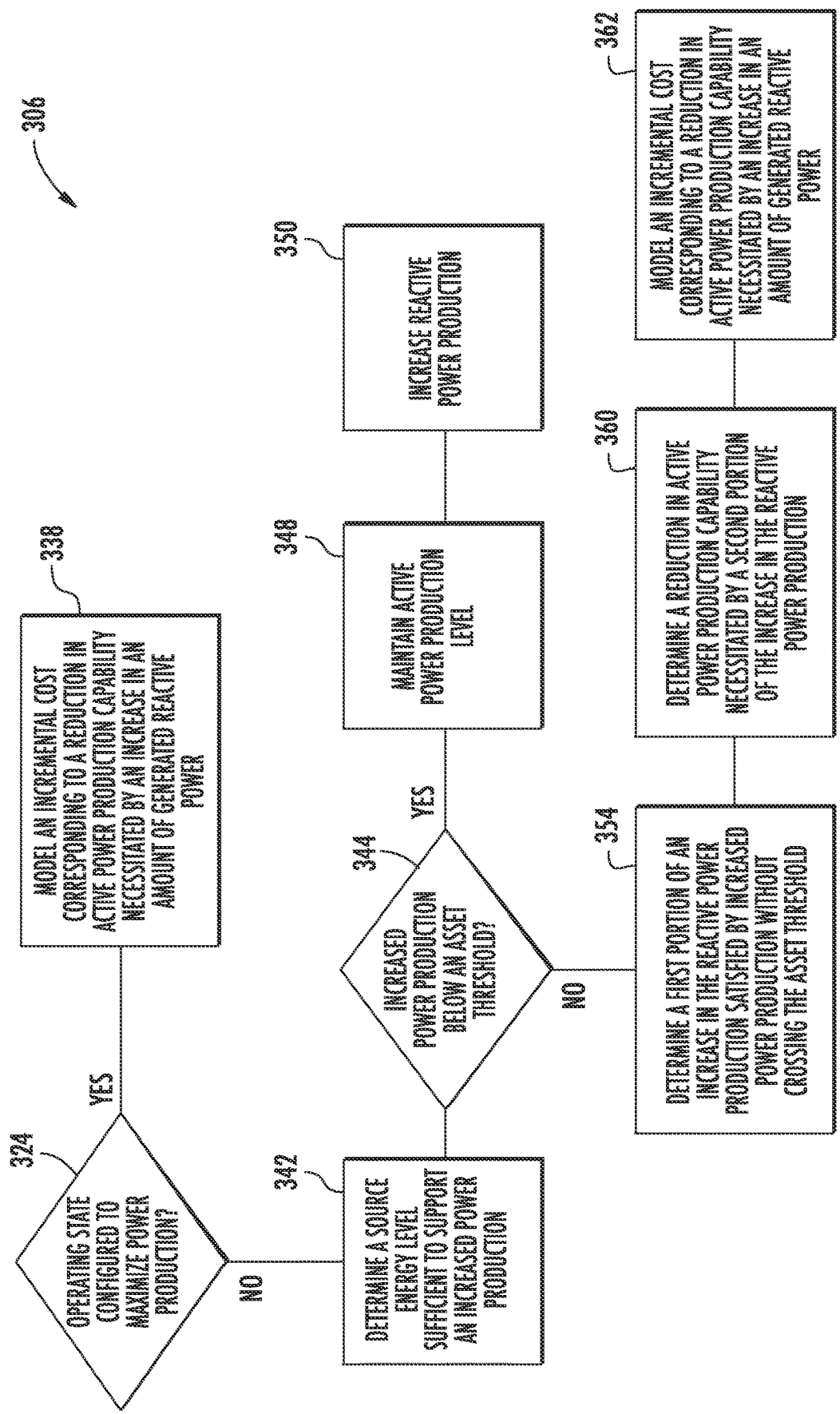
FIG. 7 illustrates a portion of the control logic of FIG. 6 according to the present disclosure.

Referring now to FIGS. 5-7, schematic diagrams of multiple embodiments of a system 300 for controlling the power generating facility 152 according to the present disclosure are presented. As shown particularly in FIG. 4, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the various components of the power generating assets 100. Further, the communications module 210 may include a sensor interface 212 (e.g., one or more analog-to-digital converters) to permit signals transmitted from one or more sensors 156, 158, 162 to be converted into signals that can be understood and processed by the processors 206. It should be appreciated that the sensors 156, 158, 162 may be communicatively coupled to the communications module 210 using any suitable means. For example, as shown in FIG. 5, the sensors 156, 158, 162 are coupled to the sensor interface 212 via a wired connection. However, in other embodiments, the sensors 156, 158, 162 may be coupled to the sensor interface 212 via a wireless connection, such as by using any suitable wireless communications protocol known in the art. Additionally, the communications module 210 may also be operably coupled to an operating state control module 214 configured to change at least one power generating asset operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, determining a reactive-power-delivery coefficient for each of the power generating assets, determining a portion of the demand signal to be satisfied by each of the plurality of power generating assets based on the reactive-power-delivery coefficient of each of the power generating assets, generating a reactive power setpoint command for each of the power generating assets, and transmitting the reactive power setpoint commands to each of the plurality of power generating assets so as to control a reactive power output of each of the plurality of power generating assets, as described herein, as well as various other suitable computer-implemented functions.

Referring particularly to FIG. 6, in an embodiment, the facility-level controller 202 of the system 300 may be configured to receive a demand signal, which may be a reactive power demand signal 302, from the electrical grid. In certain embodiments, the reactive power demand signal 302 may indicate an increased amount of reactive power to be provided by the power generating facility 152 to the electrical grid. In an additional embodiment, the demand signal 302 may indicate a decreased amount of reactive power to be provided by the power generating facility 152 to the electrical grid.

In an embodiment, as shown in FIG. 6, the facility-level controller 202 may also be configured to determine a reactive-power-delivery coefficient 304 for each of the power generating assets 100. The reactive-power-delivery coefficient 304 may include at least one of a reactive-power-generation coefficient 306 and a reactive-power-transmission coefficient 308. The reactive-power-delivery coefficient 304 may be indicative of an impact on an active power production capability of each of the power generating assets 100 due to an increase in an amount of reactive power delivered to the POI 132 for the power generating facility 152.

Referring still to FIG. 6, in an embodiment, the facility-level controller 202 may be configured to determine a portion 310 of the reactive power demand signal 302 to be satisfied by each of the plurality of power generating assets. This determination may be based on the reactive-power-delivery coefficient 304 of each of the power generating assets 100. In an embodiment, the portion 310 of the reactive power demand signal 302 satisfied by at least one power generating asset 100 may be greater than the portion 310 satisfied by at least one additional power generating asset 100.

As further depicted in FIG. 6, in at least one embodiment, the facility-level controller 202 may be configured to generate a setpoint command 312 for each of the power generating assets 100. In at least one embodiment, the setpoint command 312 may be a reactive power setpoint command 312. The reactive power setpoint command 312 may be transmitted, at 314, to each of the plurality of power generating assets 100 so as to control a reactive power output of each of the plurality of power generating assets 100.

In an embodiment, the facility-level controller 202 of the system 300 may be configured to determine the reactive-power-transmission coefficient 308 for each of the power generating assets 100. The reactive-power-transmission coefficient 308 may be indicative of the ability of each of the power generating assets 100 to transmit reactive power to the POI 132. In at least one embodiment, the reactive-power-transmission coefficient 308 may be based at least partially on a distance between each of the power generating assets 100 and the POI 132. For example, as discussed previously, in an embodiment wherein a portion of the power generating assets 100 may be arranged as the asset group 134 along the feeder line 130, the voltage staircase effect may reduce the ability of some of the power generating assets 100 to provide an increased level of reactive power to the POI 132.

In at least one embodiment, the impact of the voltage bowl or voltage staircase effect may be determined by the facility-level controller 202 as a dynamic-transmission efficiency 316. The dynamic-transmission efficiency 316 may correspond to the ability of each of the power generating assets 100 to transmit reactive power to the POI 132 at a given power set point. In such an embodiment, the facility-level controller 202 may receive, from the asset condition sensor(s) 156, data indicative of the operating state 318 of each power generating asset 100 of the asset group 134 along the feeder line 130. For example, the asset condition sensor(s) 156 may provide data corresponding to a real-time measurement of an active power production, a reactive power production, a voltage setpoint, and an operating temperature for each of the power generating assets 100. As such, in at least one embodiment, the facility-level controller 202 may determine the dynamic-transmission efficiency 316 of each of the power generating assets 100 based on the operating state 318 and a position of each power generating asset 100 within each asset group 134 relative to the POI 132. It should be appreciated that the ability at which a single power generating asset 100 may deliver reactive power to the POI 132 for a given setpoint may vary based on the behavior of each of the other power generating assets 100 on the same feeder line 130.

In an additional embodiment, the reactive-power-transmission coefficient 308 may also include a POI impedance 320 for the power generating facility 152. The POI impedance 320 may be an electrical impedance between the power generating asset 100 and the POI 132. In an embodiment, the POI impedance 320 may be derived from knowledge of the power generating facility 152 layout and cable sizes. In an additional embodiment, the POI impedance 320 for each power generating asset 100 location may be learned by an algorithm which tests each power generating asset 100 individually to derive each power generating asset's 100 POI impedance 320. For example, the POI impedance 320 for each power generating asset 100 may be determined at time of commissioning for the power generating facility 152. In a further embodiment, the facility-level controller 202 may analyze operational data to determine the POI impedance 320 for each power generating asset 100 during operational use.

In a further embodiment, the facility-level controller 202 of the system 300 may be configured to determine the reactive-power-transmission coefficient 308 by combining, at 322, the POI impedance 320 with the dynamic-transmission efficiency 316 for each of the power generating assets 100. It should be appreciated that, in such an embodiment, the reactive-power-transmission coefficient 308 may reflect an incremental cost for each power generating asset 100 to send an additional unit of reactive power to the POI 132. In at least one embodiment, this incremental cost may be measured in terms of kilowatts per kilovolt-ampere reactive (kW/kVAR). In other words, the reactive-power-transmission coefficient 308 may reflect a reduction in the amount of active power which may be delivered to the POI 132 by each of the power generating assets 100 and ultimately sold to the electrical grid.

In an embodiment, the controller 200 of the system 300 may be configured to determine the operating state 318 of each of the power generating assets. The operating state may include an active power production level, a reactive power production level, a voltage setpoint, and/or an operating temperature for each of the power generating assets 100. The controller 200 may also be configured to determine the reactive-power-generation coefficient 306 for each of the power generating assets 100. The reactive-power-generation coefficient 306 may be indicative of a reduction in kilowatts of the active power production capability per unit of increased reactive power production for each power generating asset 100 at the determined operating state 318. In other words, the reactive-power-generation coefficient 306 may be indicative of an impact on each power generating assets' 100 ability to produce active power which is ultimately sold to the electrical grid when instructed to increase the production of reactive power.

Referring still to 306 of FIG. 6, and also to FIGS. 7 and 8, in an embodiment, the controller 200 may, at 324, determine whether the operating state 318 of the power generating asset 100 is an operating state configured to maximize power production 326. The various operating states 318 may be graphically depicted, as in FIG. 8, by the illustration of a power curve relative to a source energy level for the power generating assets 100. As depicted in FIG. 8, the power level 328 may increase linearly with an increase in the source energy level until a threshold 330 is encountered. In an embodiment, as the source energy level passes the threshold 330, the power generating asset 100 may transition to/from an operating state configured to maximize power production 326 to/from an operating state configured to limit active power production 332.

In at least one embodiment, the operating state configured to limit active power production 332 may be considered to be the rated power of the power generating asset 100. It should be appreciated that the limiting of active power production may be accomplished for various reasons relating to component limits, lifecycle limits, and/or electrical grid requirements. However, the rated power may not, in an embodiment, be the maximum power producible by the power generating asset 100 based on the source energy level. As such, in an embodiment, an increased power production 334 may be available above rated power until an asset threshold 336 for the power generating asset 100 is reached. In at least one embodiment, the increased power production 334 may be in the form of an increase in reactive power production.

In an embodiment wherein the operating state 318 is an operating state configured to maximize power production, the controller 200 may be configured to model, at 338, an incremental cost in kilowatts corresponding to a reduction in the active power production capability necessitated by an increase in an amount of generated reactive power at the operating state 318. For example, in an embodiment wherein the power generating asset 100 is maximizing power production at setpoint 340(A), a demand signal for increased reactive power production at setpoint 340(B) may not be achievable through an increase in the power production at the given source energy level. In such an embodiment, any increase in the production of reactive power may necessitate a reduction in the production of active power. The reduction in production of active power may result in a decrease in the amount of active power deliverable to the POI 132 for ultimate sale to the electrical grid. In such an embodiment, the reactive-power-generation coefficient 306 may equal the incremental cost in kilowatts for each additional unit of reactive power produced by the power generating asset 100.

In an additional embodiment, the operating state 318 may be an operating state configured to limit power production 332 (e.g. at rated power). In such an embodiment, the controller 200 of the system 300 may be configured to determine a source energy level 342 sufficient to support an increased power production 334 of at least one of the power generating assets 100. In such an embodiment, the controller 200 may, at 344, determine whether the increased power production 334 due to the increased reactive power production is below the asset threshold 336. In an embodiment wherein the increased power production 334 is below the asset threshold 336, the increased power production 334 may indicate an increase in reactive power production while the active power production remains constant, thereby yielding a reactive-power-generation coefficient 306 of zero.

For example, in an embodiment, the power generating asset 100 may be limiting power production at setpoint 346(A). In such an embodiment, a reactive power demand signal 302 for increased reactive power production at setpoint 346(B) may be satisfied through maintaining, at 348, the active power production level (e.g. setpoint 346(A)) and, at 350 increasing the reactive power production of the power generating asset 100. In other words, the demand for increased reactive power production may be satisfied through the exploitation of the increased power production 334 above rated power which may be available at the source energy level.

In a further embodiment, while the operating state 318 may be an operating state configured to limit power production 332, the controller 200 may determine that the increased power production required to satisfy a reactive power demand signal 302 may exceed the asset threshold 336. In such an embodiment, the controller 200 may, at 354 determine a first portion 356 of any increase in the reactive power production to be satisfied by the increased power production 334 without crossing the asset threshold 336. In an embodiment, the first portion 356 may, at 360, be subtracted from the reactive power demand signal 302 to yield a second portion 358 of the increase in the reactive power production to be satisfied by a reduction in the active power production capability. The controller 200 may, at 362, model an incremental cost in kilowatts corresponding to the reduction in active power production capability necessitated by the second portion 358 of the increase in reactive power production. The reactive-power-generation coefficient 306 may then equal an incremental cost in kilowatts for each additional unit of reactive power not satisfied by the increased power production 334.

For example, in an embodiment, the power generating asset 100 may be limiting power production at setpoint 364(A). In such an embodiment, satisfying a reactive power demand signal 302 may require an increased reactive power production at setpoint 364(B). However, since setpoint 364(B) may exceed the asset threshold 336, only a first portion 356 of the increase may be satisfied by the increased power production 334. The remainder of the increase (e.g. second portion 358) may then be satisfied by de-rating the power generating asset 100 by the magnitude of the second portion 358 so as to reduce the active power production. In at least one embodiment, the de-rating of the power generating asset 100 may result in the establishment of a reduced active power production setpoint 364(C).

Referring again to FIG. 6, in an embodiment, the facility-level controller 202 may calculate the reactive-power-delivery coefficient 304 by combining, at 366 the reactive-power-generation coefficient 306 and the reactive-power-transmission coefficient 308. In such an embodiment, the combination of the reactive-power-generation coefficient 306 and the reactive-power-transmission coefficient 308 may indicate an impact on the active power production capability of each of the power generating assets 100 due to an increase in an amount of reactive power delivered to the POI 132 for the power generating facility 152. In other words, in an embodiment, the reactive-power-delivery coefficient 304 may reflect active power production reductions due to a loss of generating capacity necessitated by the reactive power demand signal 302 and the incremental cost for each power generating asset 100 to send additional reactive power to the POI 132.

Referring still to FIG. 6, in an embodiment, the facility-level controller 202 may, at 368, rank order the reactive-power-delivery coefficient 304 for each of the power generating assets 100. Accordingly, a higher reactive-power-delivery coefficient 304 may indicate a greater impact on the active power production capability of one of the plurality of power generating assets 100 relative to a lower reactive-power-delivery coefficient 304 of an additional power generating asset 100. Conversely, the power generating asset 100 having a lower reactive-power-delivery coefficient 304 may be more capable of providing an increase production of reactive power while minimizing an impact on active power production. As such, it may be desirable to prioritize reactive power production for those power generating assets 100 having relatively lower reactive-power-delivery coefficients 304. Based on the rank order, the facility-level controller 202 may, at 310, determine a distribution of the portions of the reactive power demand signal 302 to be satisfied by each of the power generating assets 100 of the power generating facility 152. It should be appreciated that the portion of the reactive power demand signal 302 satisfied by each of the power generating assets 100 may be tailored to the asset's ability to deliver reactive power to the POI 132 as indicated by the reactive-power-delivery coefficient 304. It should be further appreciated that the portion of the reactive power demand signal 302 satisfied by at least one of the power generating assets 100 may be different than a portion of the reactive power demand signal 302 satisfied by at least one additional power generating asset 100.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a power generating facility connected to an electrical grid, the power generating facility having a plurality of power generating assets, the method comprising: receiving, with a facility-level controller of the power generating facility, a reactive power demand signal from the electrical grid; determining, with the facility-level controller, a reactive-power delivery coefficient for each of the power generating assets comprising at least one of a reactive-power-generation coefficient and a reactive-power-transmission coefficient, wherein the reactive-power delivery coefficient is indicative of an impact on an active power production capability of each of the power generating assets due to an increase in an amount of reactive power delivered to a point of interconnect (POI) for the power generating facility; determining, with the facility-level controller, a portion of the reactive power demand signal to be satisfied by each of the plurality of power generating assets based on the reactive-power delivery coefficient of each of the power generating assets, wherein the portion of the reactive power demand signal satisfied by at least one power generating asset is greater than the portion satisfied by at least one additional power generating asset; generating, with the facility-level controller, a reactive power setpoint command for each of the power generating assets; and transmitting the reactive power setpoint commands to each of the plurality of power generating assets so as to control a reactive power output of each of the plurality of power generating assets.

Clause 2. The method of any preceding clause, wherein determining which portion of the reactive power demand signal to be satisfied by each of the plurality of power generating assets further comprises: rank ordering, with the facility-level controller, the reactive-power delivery coefficient for each of the power generating assets, wherein a higher reactive-power delivery coefficient indicates a greater impact on the active power production capability of one of the plurality of power generating assets relative to a lower reactive-power delivery coefficient of an additional power generating asset of the plurality of power generating assets, and wherein a distribution of the portions of the reactive power demand signal is based on the rank ordering.

Clause 3. The method of any preceding clause, wherein determining the reactive-power delivery coefficient further comprises: determining, with the facility-level controller, the reactive-power-transmission coefficient for each of the power generating assets, wherein the reactive-power-transmission coefficient is indicative of the ability of each of the power generating assets to transmit reactive power to the POI, the reactive-power-transmission coefficient being based at least partially on a distance between each of the power generating assets and the POI.

Clause 4. The method of any preceding clause, wherein determining the reactive-power-transmission coefficient further comprises: combining, with the facility-level controller, a POI impedance for the power generating facility with a dynamic-transmission efficiency for each of the power generating assets, wherein the transmission efficiency corresponds to an ability of each of the power generating assets to transmit reactive power to the POI at a given power set point.

Clause 5. The method of any preceding clause, wherein the plurality of power generating assets are partitioned into a plurality of asset groups, each of the asset groups being coupled a corresponding feeder line so as to be coupled in series to the POI, the method further comprising: receiving, with the facility-level controller, an indication of an operating state of each of the power generating assets, the operating state including an active power production, a reactive power production, a voltage setpoint, and an operating temperature for each of the power generating assets; and determining, with the facility-level controller, the dynamic-transmission efficiency for each of the power generating assets based on the operating state and a position of each power generating asset within each asset group relative to the POI.

Clause 6. The method of any preceding clause, wherein determining the reactive-power delivery coefficient further comprises: determining, with a controller, an operating state of each of the power generating assets, the operating state including an active power production, a reactive power production, a voltage setpoint, and an operating temperature for each of the power generating assets; and determining, with the controller, the reactive-power-generation coefficient for each of the power generating assets, wherein the reactive-power-generation coefficient is indicative of a reduction in kilowatts of the active power production capability per unit of increased reactive power production for each power generating asset at the determined operating state.

Clause 7. The method of any preceding clause, wherein determining the reactive-power delivery coefficient further comprises: determining, with the facility-level controller, the reactive-power-transmission coefficient for each of the power generating assets, wherein the reactive-power-transmission coefficient is indicative of the ability of each of the power generating assets to transmit reactive power to the POI, the reactive-power-transmission coefficient being based at least partially on a distance between each of the power generating assets and the POI; and calculating the reactive-power delivery coefficient by combining, with the facility-level controller, the reactive-power-generation coefficient and the reactive-power-transmission coefficient.

Clause 8. The method of any preceding clause, wherein the operating state is an operating state configured to maximize power production, and wherein determining the reactive-power-generation coefficient further comprises: modeling, with the controller, an incremental cost in kilowatts corresponding to a reduction in the active power production capability necessitated by an increase in an amount of generated reactive power at the operating state, wherein the reactive-power-generation coefficient equals an incremental cost in kilowatts for each additional unit of reactive power.

Clause 9. The method of any preceding clause, wherein the operating state is an operating state configured to limit power production, and wherein determining the reactive-power-generation coefficient further comprises: determining, with the controller, a source energy level sufficient to support an increased power production of at least one of the power generating assets, wherein the increased power production is below an asset threshold, and wherein the increased power production comprises an increase in the reactive power production while the active power production remains constant, the active power production yielding a reactive-power-generation coefficient of zero.

Clause 10. The method of any preceding clause, wherein the operating state is an operating state configured to limit power production, and wherein determining the reactive-power-generation coefficient further comprises: determining, with the controller, a source energy level sufficient to support an increased power production of at least one of the power generating assets; determining, with the controller, a first portion of an increase in the reactive power production satisfied by the increased power production without crossing an asset threshold; and modeling, with the controller, an incremental cost in kilowatts corresponding to a reduction in the active power production capability necessitated by a second portion of the increase in the reactive power production, wherein the reactive-power-generation coefficient equals an incremental cost in kilowatts for each additional unit of reactive power not satisfied by the increased power production.

Clause 11. The method of any preceding clause, wherein the power generating facility comprises a wind farm and the plurality of power generating assets comprise a plurality of wind turbines.

Clause 12. The method of any preceding clause, wherein the plurality of power generating assets comprise a plurality of substations of the power generating facility.

Clause 13. A system for controlling a power generating facility, the system comprising: a plurality of power generating assets coupled to an electrical grid; and a facility-level controller communicatively coupled to the plurality of power generating assets and to the electrical grid, the facility-level controller comprising at least one processor configured to perform a plurality of operations, the plurality of operations comprising: receiving a reactive power demand signal from the electrical grid, determining a reactive-power-delivery coefficient for each of the power generating assets comprising at least one of a reactive-power-generation coefficient and a reactive-power-transmission coefficient, wherein the reactive-power-delivery coefficient is indicative of an impact on an active power production capability of each of the power generating assets due to an increase in an amount of reactive power delivered to a point of interconnect (POI) for the power generating facility, determining a portion of the reactive power demand signal to be satisfied by each of the plurality of power generating assets based on the reactive-power-delivery coefficient for each of the power generating assets, wherein the portion of the reactive power demand signal satisfied by at least one power generating asset is greater than the portion satisfied by at least one additional power generating asset, generating a reactive power setpoint command for each of the power generating assets, and transmitting the reactive power setpoint commands to each of the plurality of power generating assets so as to control a reactive power output of each of the plurality of power generating assets.

Clause 14. The system of any preceding clause, wherein determining which portion of the reactive power demand signal to be satisfied by each of the plurality of power generating assets further comprises: rank ordering the reactive-power delivery coefficient for each of the power generating assets, wherein a higher reactive-power delivery coefficient indicates a greater impact on the active power production capability of one of the power generating asset of the plurality of power generating assets relative to a lower reactive-power delivery coefficient of an additional power generating asset of the plurality of power generating assets, and wherein a distribution of the portions of the reactive power demand signal is based on the rank ordering.

Clause 15. The system of any preceding clause, wherein determining the reactive-power delivery coefficient further comprises: combining a POI impedance for the power generating facility with a dynamic-transmission efficiency for each of the power generating assets, wherein the transmission efficiency corresponds to an ability of each of the power generating assets to transmit reactive power to the POI at a given power set point; and determining the reactive-power-transmission coefficient for each of the power generating assets, wherein the reactive-power-transmission coefficient is indicative of the ability of each of the power generating assets to transmit reactive power to the POI, the reactive-power-transmission coefficient being based at least partially on a distance between each of the power generating assets and the POI.

Clause 16. The system of any preceding clause, wherein the plurality of power generating assets are partitioned into a plurality of asset groups, each of the asset groups being coupled a corresponding feeder line so as to be coupled in series to the POI, the method further comprising: receiving an indication of an operating state of each of the power generating assets, the operating state including an active power production, a reactive power production, a voltage setpoint, and an operating temperature for each of the power generating assets; and determining the dynamic-transmission efficiency for each of the power generating assets based on the operating state and a position of each power generating asset within each asset group relative to the POI.

Clause 17. The system of any preceding clause, wherein determining the reactive-power delivery coefficient further comprises: determining, with a controller, an operating state of each of the power generating assets, the operating state including an active power production, a reactive power production, a voltage setpoint, and an operating temperature for each of the power generating assets; and determining, with the controller, the reactive-power-generation coefficient for each of the power generating assets, wherein the reactive-power-generation coefficient is indicative of a reduction in kilowatts of the active power production capability per unit of increased reactive power production for each power generating asset at the determined operating state.

Clause 18. The system of any preceding clause, wherein determining the reactive-power-delivery coefficient further comprises: calculating the reactive-power delivery coefficient by combining the reactive-power-generation coefficient and the reactive-power-transmission coefficient.

Clause 19. The system of any preceding clause, wherein the operating state is an operating state configured to limit power production, and wherein determining the reactive-power-generation coefficient further comprises: determining, with the controller, a source energy level sufficient to support an increased power production of at least one of the power generating assets; determining, with the controller, a first portion of an increase in the reactive power production satisfied by the increased power production without crossing an asset threshold; and modeling, with the controller, an incremental cost in kilowatts corresponding to a reduction in the active power production capability necessitated by a second portion of the increase in the reactive power production, wherein the reactive-power-generation coefficient equals incremental cost in kilowatts for each additional unit of reactive power not satisfied by the increased power production.

Clause 20. The system of any preceding clause, wherein the power generating facility comprises a wind farm and the plurality of power generating assets comprise a plurality of wind turbines.

What is claimed is:

1. A method for controlling a power generating facility connected to an electrical grid, the power generating facility having a plurality of power generating assets, the method comprising:

receiving, with a facility-level controller of the power generating facility, a demand signal from the electrical grid;

determining, with the facility-level controller, a reactive-power delivery coefficient for each of the power generating assets comprising at least one of a reactive-power-generation coefficient and a reactive-power-transmission coefficient, wherein the reactive-power delivery coefficient is indicative of an impact on an active power production capability of each of the power generating assets due to a change in an amount of reactive power delivered to a point of interconnect (POI) for the power generating facility, wherein determining the reactive-power delivery coefficient further comprises:

determining an operating state of each of the power generating assets, the operating state defining at least one of an active power production, a reactive power production, a voltage setpoint, and an operating temperature for each of the power generating assets; and determining the reactive-power-generation coefficient for each of the power generating assets, wherein the reactive-power-generation coefficient is indicative of a reduction in kilowatts of the active power production per unit of increased reactive power production for each power generating asset at the determined operating state;

determining, with the facility-level controller, a portion of the reactive power demand signal to be satisfied by each of the plurality of power generating assets based on the reactive-power delivery coefficient of each of the power generating assets, wherein the portion of the reactive power demand signal satisfied by at least one power generating asset is greater than the portion satisfied by at least one additional power generating asset;

generating, with the facility-level controller, a setpoint command for each of the power generating assets; and transmitting the setpoint commands to each of the plurality of power generating assets so as to control a reactive power output of each of the plurality of power generating assets.

2. The method of claim 1, wherein determining which portion of the reactive power demand signal to be satisfied by each of the plurality of power generating assets further comprises:

rank ordering, with the facility-level controller, the reactive-power delivery coefficient for each of the power generating assets, wherein a higher reactive-power delivery coefficient indicates a greater impact on the active power production capability of one of the plurality of power generating assets relative to a lower reactive-power delivery coefficient of an additional power generating asset of the plurality of power generating assets, and wherein a distribution of the portions of the reactive power demand signal is based on the rank ordering.

3. The method of claim 1, wherein determining the reactive-power delivery coefficient further comprises:

determining, with the facility-level controller, the reactive-power-transmission coefficient for each of the power generating assets, wherein the reactive-power-transmission coefficient is indicative of the ability of each of the power generating assets to transmit reactive power to the POI, the reactive-power-transmission coefficient being based at least partially on a distance between each of the power generating assets and the POI.

4. The method of claim 3, wherein determining the reactive-power-transmission coefficient further comprises:

combining, with the facility-level controller, a POI impedance for the power generating facility with a dynamic-transmission efficiency for each of the power generating assets, wherein the dynamic-transmission efficiency corresponds to an ability of each of the power generating assets to transmit reactive power to the POI at a given power set point.

5. The method of claim 4, wherein the plurality of power generating assets are partitioned into a plurality of asset groups, each of the asset groups being coupled a corresponding feeder line so as to be coupled in series to the POI, the method further comprising:

receiving, with the facility-level controller, an indication of an operating state of each of the power generating assets, the operating state including an active power production, a reactive power production, a voltage setpoint, and an operating temperature for each of the power generating assets; and determining, with the facility-level controller, the dynamic-transmission efficiency for each of the power generating assets based on the operating state and a position of each power generating asset within each asset group relative to the POI.

6. The method of claim 1, wherein determining the reactive-power delivery coefficient further comprises:

determining, with the facility-level controller, the reactive-power-transmission coefficient for each of the power generating assets, wherein the reactive-powertransmission coefficient is indicative of the ability of each of the power generating assets to transmit reactive power to the POI, the reactive-power-transmission coefficient being based at least partially on a distance between each of the power generating assets and the POI; and calculating the reactive-power delivery coefficient by combining, with the facility-level controller, the reactive-power-generation coefficient and the reactive-power-transmission coefficient.

7. The method of claim 1, wherein the operating state is an operating state configured to maximize power production, and wherein determining the reactive-power-generation coefficient further comprises:

modeling, with the controller, an incremental cost in kilowatts corresponding to a reduction in the active power production capability necessitated by an increase in an amount of generated reactive power at the operating state, wherein the reactive-power-generation coefficient equals an incremental cost in kilowatts for each additional unit of reactive power.

8. The method of claim 1, wherein the operating state is an operating state configured to limit power production, and wherein determining the reactive-power-generation coefficient further comprises:

determining, with the controller, a source energy level sufficient to support an increased power production of at least one of the power generating assets, wherein the increased power production is below an asset threshold, and wherein the increased power production comprises an increase in the reactive power production while the active power production remains constant, the active power production yielding a reactive-power-generation coefficient of zero.

9. The method of claim 1, wherein the operating state is an operating state configured to limit power production, and wherein determining the reactive-power-generation coefficient further comprises:

determining, with the controller, a source energy level sufficient to support an increased power production of at least one of the power generating assets;

determining, with the controller, a first portion of an increase in the reactive power production satisfied by the increased power production without crossing an asset threshold; and modeling, with the controller, an incremental cost in kilowatts corresponding to a reduction in the active power production capability necessitated by a second portion of the increase in the reactive power production, wherein the reactive-power-generation coefficient equals an incremental cost in kilowatts for each additional unit of reactive power not satisfied by the increased power production.

10. The method of claim 1, wherein the power generating facility comprises a wind farm and the plurality of power generating assets comprise a plurality of wind turbines.

11. The method of claim 1, wherein the plurality of power generating assets comprise a plurality of substations of the power generating facility.

12. A system for controlling a power generating facility, the system comprising:

a plurality of power generating assets coupled to an electrical grid; and a facility-level controller communicatively coupled to the plurality of power generating assets and to the electrical grid, the facility-level controller comprising at least one processor configured to perform a plurality of operations, the plurality of operations comprising:

receiving a reactive power demand signal from the electrical grid;

determining a reactive-power-delivery coefficient for each of the power generating assets comprising at least one of a reactive-power-generation coefficient and a reactive-power-transmission coefficient, wherein the reactive-power-delivery coefficient is indicative of an impact on an active power production capability of each of the power generating assets due to an increase in an amount of reactive power delivered to a point of interconnect (POI) for the power generating facility, wherein determining the reactive-power delivery coefficient further comprises:

determining an operating state of each of the power generating assets, the operating state defining at least one of an active power production, a reactive power production, a voltage setpoint, and an operating temperature for each of the power generating assets; and determining the reactive-power-generation coefficient for each of the power generating assets, wherein the reactive-power-generation coefficient is indicative of a reduction in kilowatts of the active power production per unit of increased reactive power production for each power generating asset at the determined operating state;

determining a portion of the reactive power demand signal to be satisfied by each of the plurality of power generating assets based on the reactive-power-delivery coefficient for each of the power generating assets, wherein the portion of the reactive power demand signal satisfied by at least one power generating asset is greater than the portion satisfied by at least one additional power generating asset;

generating a reactive power setpoint command for each of the power generating assets; and transmitting the reactive power setpoint commands to each of the plurality of power generating assets so as to control a reactive power output of each of the plurality of power generating assets.

13. The system of claim 12, wherein determining which portion of the reactive power demand signal to be satisfied by each of the plurality of power generating assets further comprises:

rank ordering the reactive-power delivery coefficient for each of the power generating assets, wherein a higher reactive-power delivery coefficient indicates a greater impact on the active power production capability of one of the power generating asset of the plurality of power generating assets relative to a lower reactive-power delivery coefficient of an additional power generating asset of the plurality of power generating assets, and wherein a distribution of the portions of the reactive power demand signal is based on the rank ordering.

14. The system of claim 12, wherein determining the reactive-power delivery coefficient further comprises:

combining a POI impedance for the power generating facility with a dynamic-transmission efficiency for each of the power generating assets, wherein the dynamic-transmission efficiency corresponds to an ability of each of the power generating assets to transmit reactive power to the POI at a given power set point; and determining the reactive-power-transmission coefficient for each of the power generating assets, wherein the reactive-power-transmission coefficient is indicative of the ability of each of the power generating assets to transmit reactive power to the POI, the reactive-power-transmission coefficient being based at least partially on a distance between each of the power generating assets and the POI.

15. The system of claim 14, wherein the plurality of power generating assets are partitioned into a plurality of asset groups, each of the asset groups being coupled a corresponding feeder line so as to be coupled in series to the POI, the method further comprising:
receiving an indication of an operating state of each of the power generating assets, the operating state including an active power production, a reactive power production, a voltage setpoint, and an operating temperature for each of the power generating assets; and
determining the dynamic-transmission efficiency for each of the power generating assets based on the operating state and a position of each power generating asset within each asset group relative to the POI.

16. The system of claim 12, wherein determining the reactive-power-delivery coefficient further comprises:
calculating the reactive-power delivery coefficient by combining the reactive-power-generation coefficient and the reactive-power-transmission coefficient.

17. The system of claim 12, wherein the operating state is an operating state configured to limit power production, and wherein determining the reactive-power-generation coefficient further comprises:
determining, with the controller, a source energy level sufficient to support an increased power production of at least one of the power generating assets;
determining, with the controller, a first portion of an increase in the reactive power production satisfied by the increased power production without crossing an asset threshold; and modeling, with the controller, an incremental cost in kilowatts corresponding to a reduction in the active power production capability necessitated by a second portion of the increase in the reactive power production, wherein the reactive-power-generation coefficient equals incremental cost in kilowatts for each additional unit of reactive power not satisfied by the increased power production.

18. The system of claim 12, wherein the power generating facility comprises a wind farm and the plurality of power generating assets comprise a plurality of wind turbines.

* * * * *